United States Patent [19]

Choinski

[11] Patent Number: 4,756,856
[45] Date of Patent: * Jul. 12, 1988

[54] METHOD OF AND APPARATUS FOR FORMING SURFACE OF MAGNETIC MEDIA

[75] Inventor: Edward J. Choinski, Wayland, Mass.

[73] Assignee: Polaroid Corporation, Cambridge, Mass.

[*] Notice: The portion of the term of this patent subsequent to May 6, 2003 has been disclaimed.

[21] Appl. No.: 684,097

[22] Filed: Dec. 20, 1984

[51] Int. Cl.$^4$ .............................................. B29B 13/08
[52] U.S. Cl. .................................... 264/22; 264/24; 264/25; 264/106; 264/108; 264/316; 425/3; 425/174; 425/174.4
[58] Field of Search ............... 264/22, 24, 106, 107, 264/284, 316, 108, 25, 26; 427/130; 425/174.4, 174, 810, 3

[56] References Cited

U.S. PATENT DOCUMENTS

| | | | |
|---|---|---|---|
| 2,628,929 | 2/1953 | Persoon et al. | 154/97.5 |
| 3,507,733 | 4/1970 | Davidson | 264/284 |
| 3,817,785 | 6/1974 | Abitboul | 117/237 |
| 3,882,207 | 5/1975 | Hannan et al. | 264/284 |
| 3,916,039 | 10/1975 | Akashi et al. | 427/128 |
| 3,943,666 | 3/1976 | Dion et al. | 51/106 |
| 3,996,328 | 12/1976 | Coffin et al. | 264/284 |
| 4,038,442 | 7/1977 | Utumi | 427/128 |
| 4,044,174 | 8/1977 | Carr | 427/130 |
| 4,239,821 | 12/1980 | McLean et al. | 427/358 |
| 4,254,585 | 3/1981 | Schoettle et al. | 51/5 |
| 4,272,602 | 6/1981 | Stemme et al. | 430/140 |
| 4,273,603 | 6/1981 | Peronnet et al. | 156/236 |
| 4,294,782 | 10/1981 | Froehlig | 264/106 |
| 4,298,631 | 11/1981 | Mikura et al. | 427/130 |
| 4,312,898 | 1/1982 | McDaniel | 427/130 |
| 4,327,130 | 4/1982 | Pipkin | 427/209 |
| 4,332,840 | 6/1982 | Tanaka et al. | 427/130 |
| 4,336,278 | 6/1982 | Pertzsch et al. | 427/47 |
| 4,349,402 | 9/1982 | Parker | 156/233 |
| 4,374,077 | 2/1983 | Kerfeld | 264/22 |
| 4,407,853 | 10/1983 | Okita et al. | 427/44 |
| 4,414,271 | 11/1983 | Kitamoto et al. | 427/128 |
| 4,449,916 | 5/1984 | Ito et al. | 264/107 |
| 4,451,502 | 5/1984 | Takada et al. | 427/128 |
| 4,500,484 | 2/1985 | Gregg | 264/107 |
| 4,518,627 | 5/1985 | Foley et al. | 427/130 |
| 4,531,990 | 7/1985 | Iijima | 427/130 |
| 4,543,551 | 9/1985 | Petersen | 335/284 |
| 4,547,393 | 10/1985 | Asai et al. | 427/48 |
| 4,569,806 | 2/1986 | Holster | 264/1.3 |
| 4,587,066 | 5/1986 | Rodriguez | 264/22 |
| 4,594,315 | 6/1986 | Shibue et al. | 430/531 |

FOREIGN PATENT DOCUMENTS 55-67943  5/1980  Japan .
56-126132  2/1981  Japan .

Primary Examiner—Jan H. Silbaugh
Assistant Examiner—MaryLynn Fertig
Attorney, Agent, or Firm—Leslie J. Payne

[57] ABSTRACT

There are disclosed an apparatus and method of forming magnetic recording media having surfaces thereof replicated while being in the process of being cured.

9 Claims, 2 Drawing Sheets

METHOD OF AND APPARATUS FOR FORMING SURFACE OF MAGNETIC MEDIA

CROSS-REFERENCE TO OTHER APPLICATIONS

Reference is made to commonly assigned copending application Ser. No. 627,054 filed July 2, 1984 (now U.S. Pat. No. 4,587,066) and application Ser. No. 627,055, filed July 2, 1984 (now U.S. Pat. No. 4,543,551).

BACKGROUND OF THE INVENTION

The present invention is, in general, directed to a method of an apparatus for producing magnetic recording media.

The use of magnetic layers or magnetic strips for storing and recording information and other data has become widespread. Several techniques are known for preparing magnetic recording media. Typically, they include applying a magnetic coating containing magnetic or magnetically permeable particles dispersed in a curable binder on a tape or disk surface. For giving the particles a preferred directional orientation they are passed through a magnetic orienting field.

In the production of magnetic recording media it is, however, advantageous to have the magnetic recording layer as smooth as possible. In other words, the magnetic recording layer should be free of indentations, irregularities or undulations. These irregularities would in effect create spacing variations between the magnetic head and the recording medium. Such variations are significant insofar as the signal output will correspondingly vary. These surface variations or fluctuations, as noted, manifest themselves as amplitude variations or fluctuations in the recorded or reproduced signals. Such variations are particularly objectionable insofar as they diminish the sensitivity of the recording media.

Moreover, since a smoother surface on the magnetic recording layer reduces the spacing between the head gap and the layer, the recording head can be spaced closer to the recording surface. This means that the head can be used more successfully in conjunction with higher density recording media. Furthermore, a smoother surface tends to reduce rather significantly the mechanical wear on the head.

There can be several causes for the presence of such irregularities in the recording media. For example, the material used therefor may have fillers which create protrusions. Another cause for surface irregularities such as streaks, undulations or gouges, arises from the coating operation itself. Aside from the foregoing there is, of course, the problem of dust and other particles becoming imbedded in the coating while the media is being formed.

To remedy the foregoing disadvantages a number of approaches have been set forth. One rather common technique for minimizing the surface irregularities is to calendar the coated web. While calendaring, in general, is a satisfactory operation it nonetheless suffers from certain drawbacks. The most significant being the fact that the calendaring rolls themselves are not as entirely smooth as could otherwise be desired. This is because the calendaring rolls themselves have protrusions or gouges which create complementary shaped surface irregularities. In fact even with calendering only a certain proportion of the protrusions in the layer are smoothed or leveled out. In this regard larger and harder protrusions in the magnetic layer only partially undergo elastic deformation during calendaring and are not smoothed after the coated web has passed the calendar nip.

Another way of improving the surface properties of recording media is to pass the coated flexible substrate over a resilient supporting cylinder and burnish the surface of the magnetic coating with an abrasive cylinder. This approach is, however, less than ideal inasmuch as the surface frequently exhibits scratches because of the abrasive cylinder used. An example of such a burnishing process is described generally in U.S. Pat. No. 3,943,666. Besides the foregoing drawbacks burnishing tends to increase the roughness of the surface and create abrasive dust which must be cleaned periodically. An example of an improved burnishing process is set forth in U.S. Pat. No. 4,254,585.

Still another approach for attempting to provide a smooth finish to magnetic coating is essentially a coating transfer method. In such a method, a magnetic coating is applied to a temporary support or release sheet. Then the applied coating is, through a process of lamination, applied to a permanent substrate. Following this the release sheet with the substrate and the magnetic coating therebetween have pressure applied thereto. Subsequent to such pressure application the release sheet is stripped from the magnetic layer. In this approach, the release sheet has a smooth surface which improves the smoothness of the stripped magnetic coating. Such an approach an improvement over the known calendaring and burnishing processes. Nonetheless problems arise if incomplete and partial transfer of the coating takes place. This tends to occur because the coating is still somewhat wet in nature. U.S. Pat. No. 4,312,898 discloses a process for making magnetic tapes in which a temporary release sheet is provided for transferring the magnetic layer to a permanent substrate and simultaneously provide a smooth surface for the magnetic coating.

SUMMARY OF THE INVENTION

It is an object of the present invention to overcome the foregoing disadvantages associated with the production of magnetic recording media especially as they relate to providing different surface configurations thereon.

In accordance with the principles of this invention there is provided a process for forming magnetic recording media. Included in the process is the step of applying an uncured coating to a substrate surface and drying it. Following the drying step is the step of forming a surface configuration on the exterior surface of the soft, impressionable and uncured coating by the use of a forming member having a preselected configuration. The forming member contacts the soft coating to form the desired surface configuration. Of course, the surface configuration is complementary to that of the preselected configuration. The coating is electron beam cured while or immediately following the surface configuration being formed.

In one preferred embodiment, the forming step includes pressing a disk carrying a plurality of concentric grooves into the uncured layer so that complementary shaped concentric grooves are formed in the layer. Simultaneously with or immediately following the shaping an electron beam cures the layer.

Further in accordance with the present invention there is provided a process of producing magnetic recording media having a plurality of discrete and closely spaced concentric magnetic tracks. This process comprises a step for forming a preselected surface configuration in a layer of soft, impressionable and uncured material, wherein the configuration comprises a plurality of juxtaposed concentric grooves. The uncured layer is cured so that the configured grooves retain their desired shape. Subsequently, an uncured magnetic material is applied to the grooved surface so that the magnetic material substantially fills the grooves therein. Thereafter, the magnetic material in the grooves has a smoothing sheet placed in overlying relationship thereto and the magnetic material is cured. As a result, the smoothing sheet imparts a smooth surface to the magnetic material. As a consequence of the foregoing process there is provided an inexpensive, yet extremely reliable means of producing a plurality of recording media have a multiplicity of concentric magnetic recording tracks.

Among the objects of the invention are the provision of a process for forming magnetic recording media wherein the surface of an uncured impression layer is formed with a plurality of grooves by having a forming member engage therewith while at the same time curing such layer; the provision of a process of the last noted type wherein uncured magnetic material fills the grooves of the cured impression layer followed by having a releasable smoothing sheet temporarily brought into contact with the magnetic layer while the latter is being cured to thereby form an extremely smooth recording surface having discrete concentric tracks which are substantially free of surface irregularities.

Other objects and further scope of applicability of the present invention will become apparent from the detailed description to follow when taken in conjunction with the accompanying drawings in which like parts are designated by like reference numerals throughout the several views.

DETAILED DESCRIPTION

Reference is made to FIGS. 1-6 for illustrating apparatus used for producing magnetic recording media. It is contemplated that such media have applicability for data recording purposes; particularly audio and video uses.

Figure 5:
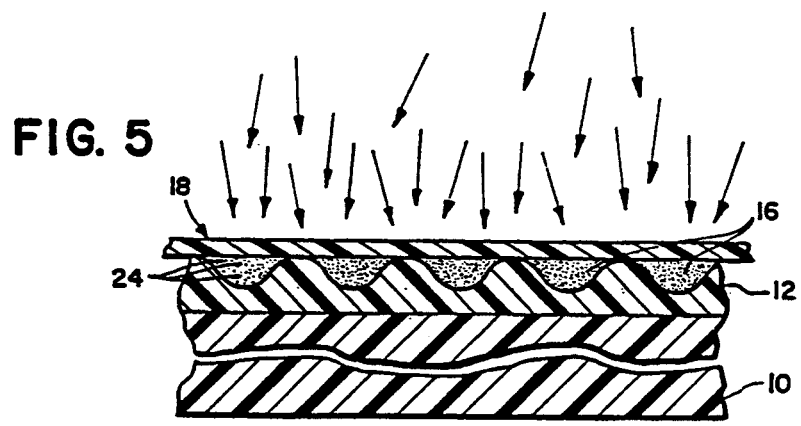
FIG. 5 is an enlarged fragmentary cross-sectional view of another step in accordance with the present invention; and, FIG. 6 is a schematic view of another embodiment of the present invention.

Depicted is a carrier or supporting substrate base 10 which is to be successfully coated with an electron beam curable impression layer 12 and a magnetic recording material to form a plurality of discrete magnetic recording channels or tracks 16 (FIG. 5). Also to be described is a strippable covering sheet 18 which is to be applied to the top surface of the magnetic recording material for several purposes including minimizing significantly surface disruptions of the magnetic tracks 16.

Returning to the carrier 10, it can be made from a wide variety of materials typically used for magnetic recording media. These materials are, generally, dimensionally stable under environmental temperatures in which the recording media is typically used. These materials include, but are not limited to polyolefin groups, such as polypropylene and the like; and polyester groups, such as polyethylene-terephthalate. In the present embodiment, the carrier 10 is made of thin sheet of polyethyleneterephthalate.

Of course, the carrier 10 can have a variety of configurations for magnetic recording purposes, for example, tapes and floppy disks. In the illustrated embodiment, the carrier 10 is initially in the form of a web. It will be pointed out that the web can be cut by any suitable process to form the carrier 10 or even a magnetic recording disk (not shown). The thickness of the carrier 10, therefore, should fall within a range facilitating subsequent use as a disk. Although not shown, a double sided tape or disk is contemplated by the present invention. By double sided, it is meant that another magnetic recording layer would be formed on the opposite side of the carrier 10.

In this embodiment the thickness of carrier 10 may be in the range of, for example, 0.3 to 7.5 mils. The carrier base 10 is treated by known techniques before the impression layer 12 is applied. Details of such preparation do not, per se, form an aspect of this invention. Hence, a description thereof has been omitted.

Figure 1:
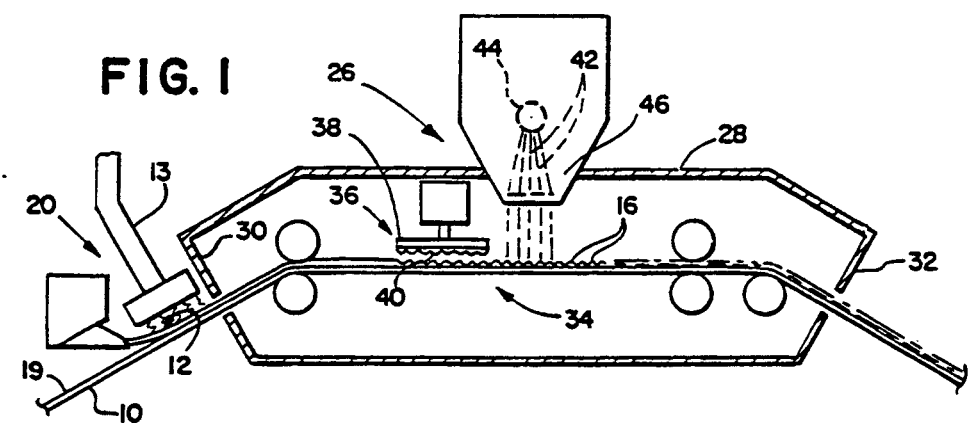
FIG. 1 is a diagrammatic view of one segment of a process of producing magnetic recording media in accordance with the present invention.
Figure 2:
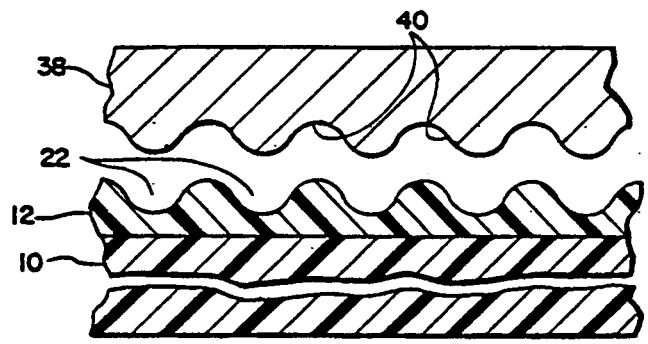
FIG. 2 is a fragmentary cross-sectional view of a layer used in magnetic recording media being pressed with a particular surface configuration.
Figure 3:
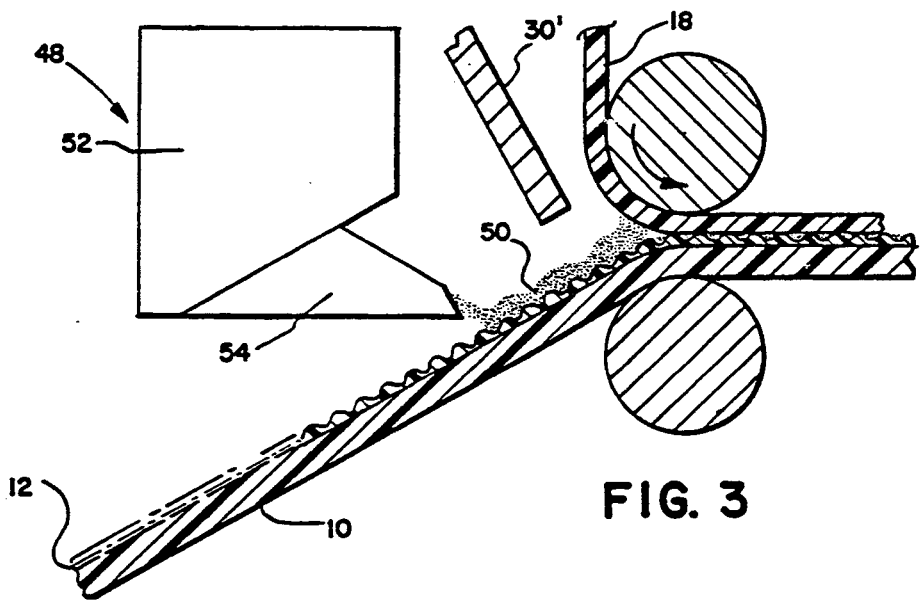
FIG. 3 is an enlarged fragmentary view showing the despositing of a magnetic oxide material into multiple grooves.

The present embodiment discloses that the impression layer 12 is applied to one surface 19 of the carrier 10. A variety of coating techniques can be used for this purpose. In this connection, coating knives, doctor blades, dip coating, squeeze coating, reverse roll coating, etc. can be used. In this embodiment there is shown a squeeze coating device generally at 20 which applies the material in the desired manner (FIG. 1).

The composition of the impression layer 12 is a binder which is polymerizable by electron beam energy. The binder would include an electron beam curable monomer, and a relatively high weight polymer, such as a suitable urethane. The monomer is used so as to make the composition soft and impressionable. As will be pointed out later, just the monomer could be used if the monomer were subject to electron beam curing as it was being pressed. Of course, the impression layer 12 can include conventional additives, such as a lubricant, corrosion inhibitor, antistatic agent, etc. Details of such materials have not been described since they do not form part of this invention. The impression layer 12 is applied in a wet condition and then dried. Its dried thickness is suitable for forming a magnetic recording disk or tape. A thickness, for instance, in the range of 2 to 15 microns is useful for disks. Such a range permits the formation of grooves or channels 22 which receive therein magnetic material having particles 24 suspended therein. The grooves 22 are deep enough to allow the particles 24 to rotate and assume, if desired, a perpendicular orientation under the influence of the magnetic orienting field. The foregoing description of thickness ranges is given for purposes of illustration and not limitation.

Although this embodiment discloses use of one particular kind of binder, it should be pointed out that other suitable curable binders, preferably electron beam curable, can be used. In this regard, the binder can include compounds containing an acrylyl group; an acrylamido group; an allyl group; a vinyl ether group; and, unsaturated polyesters. The foregoing examples are illustrative of some of the compounds which are electron beam curable. They are not all inclusive.

With reference again to FIG. 1, it will be seen that the carrier 10 passes the coating station 20 whereat impression layer 12 is applied by virtue of squeeze coating. Hence, it will not be discussed in detail. Following such application of a wet impression layer 12 and subsequent drying by a hot air drying apparatus 13, the coated carrier 10 is advanced to a pressing and electron beam curing station 26.

electron beam curing is carried out by a conventional electron beam apparatus 28; such as the type manufactured by Energy Sciences Inc. of Woburn, Mass. The inlet and outlet portions 30, 32 are slopped upwardly and downwardly; respectively, for preventing reflected electron beams from escaping. Prior to the coated carrier 10 entering an electron beam plenum chamber 34, it passes a surface formation station 36. At the formation station 36, there is provided a motor driven vertically reciprocating platen 38 carrying a master pattern 40. In this embodiment, the pattern 40 takes the form of a circular disk having protrusions formed thereon such that when the pattern 40 is pressed onto the soft impression layer 12 it forms the grooves 22. These grooves 22 are suitably separated so that they can assist in forming discrete concentric recording magnetic tracks. For example, there can be 1500 to 2000 grooves per inch. It will, therefore, be appreciated that the depicted sizes of the grooves have been exaggerated for purposes of illustration. Such sizes are not to be construed as actual relative dimensions.

It should be noted that while the present embodiment discloses a vertical reciprocating pressing operation it will be understood that several other pressing or embossing techniques can be used. For instance, a roll carrying similar protrusions can be temporarily brought into contact with the soft, impressionable layer 12 for purposes of forming the grooves.

After the pressing step, the carrier 10 is passed promptly to the plenum chamber 34. Upon entering the plenum chamber 34 the layer 12 is irradiated with high energy electron beams 42. These beams 42 issue forth from an electron beam energy rod 44 contained in a high vacuum chamber 46. The beams 42 are focused such that they pass through a titanium window (not shown) and encompass a preselected area on the layer 12. The energy rod 44 is suitably operated so that it produces an acceleration voltage sufficient to effectuate polymerization of the binder. This acceleration voltage can be in a suitable range, for example, from about 150 to 300 kilovolts. With acceleration voltages in such a range the adsorbed dosage in the layer 12 is adequate for causing complete curing in less than a second. Although the curing need not be completed while the layer 12 is in the plenum chamber, the dosage should be sufficient to initiate the polymerization process.

The present invention also contemplates that other forms of electromagnetic energy can be used to bring about curing. For example, ultraviolet energy might be used. Electron beam curing is preferred because there is a greater likelihood of the grooves being relatively instantly cured and thereby retaining their desired shape.

Figure 6:
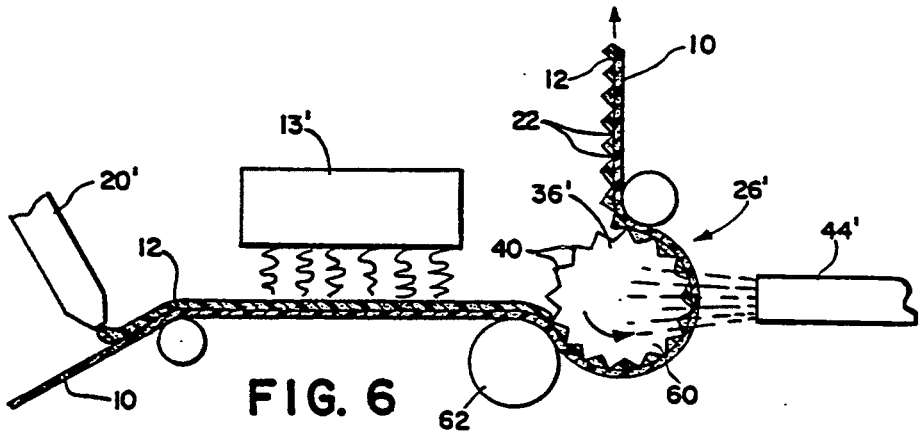

Reference is now made to FIG. 6 for showing another embodiment. Instead of curing the impressionable layer 12 subsequent to processing and releasing of the forming member, the layer is cured while it is being pressed. Substantially simultaneously curing and pressing have the advantage of allowing the impressionable layer 12 to be made of just an electron beam curable monomer. In other words, the monomer material need not retain its shape after release of the forming member because it's being cured while being pressed. In this embodiment, however, the impression layer 12 is made of the same material as in the other layer. The coating device 20' deposits the impressionable layer 12 on the advancing web. If solvent is to be removed prior to the layer being impressed, the layer is dried by the hot air drying apparatus 13'. Following impressed drying, the layer 12, which is soft and impressionable, passes to the forming and curing station 26'. At the forming and curing station, there is, as illustrated, a forming station 36 which includes a rotary pressing wheel 60 having radially extending and circumferentially spaced projections 40'. These projections form complementary shaped grooves 22' in the soft and impressionable layer 12. A rubber pressing roller 62 presses the coated web 10 into engagement with the pressing wheel 60 so that the latter can form the grooves 22'. During the impression forming operation, the electron beam energy rod 44' irradiates the layer 12 sufficiently to cure it, whereby the groove 22' can retain the dimensions formed by the pressing roller 62. The illustrated embodiment is but one way of generally simultaneously forming and curing the layer 12. Subsequently, the cured layer 12 carried on the web 10 is peeled from the pressing roller 60 for further treatment consistent with the present invention.

Reference is now made back to the first embodiment for a continuation of the process of the first embodiment. It should be pointed out that the following described steps can be performed following the steps set forth in connection with the embodiment of FIG. 6.

Upon leaving the plenum chamber 34 the layer 12 having the plurality of cured grooves 22 advances to a second coating station 48, whereat a liquid magnetic oxide material 50 is discharged onto the layer 12. For purposes of discharging the magnetic oxide material 50 there is provided a coating unit 52 having a nozzle 54 at a predetermined setting above the grooves 22. The nozzle 54 discharges the magnetic material 50 at a rate in conjunction with the speed of the carrier 10 such that the grooves 22 are filled prior to the strippable smoothing layer 18 being applied, in overlying relationship, to the magnetic oxide filled grooves 22. At this coating station 48, the discharge rate of the magnetic material 50 can be varied automatically to insure a relatively uniform discharge rate. In this regard suitable apparatus not forming part of this invention can be used to monitor and regulate the discharge rate.

The composition of the magnetic recording material 50 includes essentially anisotropic magnetic particles 24 dispersed in a binder solution. These particles are generally uniformly dispersed in the binder which is polymerizable by electron beam energy. Of course, the magnetic recording material 50 can include conventional additives, such as lubricants, abrasive agents, corrosion inhibitors, antistatic agents, etc. The magnetic material 50 when applied in a wet condition should fill the grooves. For example, the depth of the grooves 22 can be 0.2–5 µm. Such a depth permits the magnetic particles used in recording media to rotate and assume a perpendicular orientation, if desired, without projecting from the top surface of the grooves 22. The foregoing description of groove depth has been given for purposes of illustration and not limitation. Although this embodiment discloses use of a binder without a solvent, it should be pointed out that a suitable electron beam curable binder with a solvent may be utilized instead. If a solvent is used, a suitable drying step would be needed prior to curing to evaporate the solvent.

In regard to the ferromagnetic particles 24 in the magnetic material, they can be of the anistropic ferromagnetic type; such as gamma-$Fe_2O_3$, cobalt-doped gamma $Fe_2O_3$; $Fe_3O_4$; and other known ferromagnetic fine powders. Also, hexagonal ferrite platelets such as cobalt-doped gamma $Fe_3O_4$ can be used. Although ferromagnetic powders have been described, it should be appreciated that other magnetic particles can be used. Magnetizable particles can be used as well. These particles can have an acicular or rice-like shape. Typically, they have a rather low length/diameter ratio (3:1 to 10:1). A range for the lengths of such particles can be 0.1 to 0.7 microns. The particles are added in an amount, by weight, with respect to the binder, that is conventional for the making of magnetic recording media. Of course, such amounts are, in general, determined by the eventual end use of the media. For example, floppy disks have different amounts than say recording tape. Also, the particles can have a needle-like shape in which case they have a different aspect ratio than acicular-shaped particles or platelets. The particles can be arranged to have their easy axes of magnetization aligned randomly. For facilitating dispersion of the particles a dispersing agent is used. As will be described, the particles are given a preferred orientation by a magnetic orienting field before they are frozen or fixed in the layer by the electron beam curing.

Reference is made back again to the binder of the magnetic material 50. In this regard, the binder can include compounds containing an acrylyl group; an acrylamido group; an allyl group; a vinyl ether group; and, unsaturated polyesters. The foregoing examples are illustrative of some of the compounds which are electron beam curable. They are not all inclusive. For instance the binder compound can be IBMA which is an abbreviation of isobutoxymethylolacrylamide. The IBMA in this embodiment was obtained from American Cyanamid Corp., New York. Such a binder is readily commercially available.

In this embodiment, the releasable smoothing sheet 18 is made of an extremely smooth and flexible material. The smoothing sheet 18 has sufficient beam strength to minimize significantly the disruptions caused by chaining of such particles when they are subjected to a very strong magnetic orienting field. In this regard see the previously noted commonly assigned and copending application. The smoothing sheet 18 is applied prior to particle orienting, but after the second coating step. The smoothing sheet 18 remains in intimate engagement by reason of the wetness of the magnetic material 50. Subsequent to orientation and curing the smoothing sheet 18 is peeled off in a conventional manner.

In this embodiment the smoothing sheet 18 is made of a thin sheet of polyethylene-terephithalate which will not be adversely affected by electron beam curing. Also the smoothing sheet 18 has low mass so as to minimize unwanted absorbtion of electron beams thereby. In this regard, the cover sheet 18 can have a thickness which is approximately equal to that of the carrier 10. The smoothing sheet 18 does not react to the electron beam curing step in a manner which would adversely affect the surface or curing of the magnetic material. To facilitate peeling, the smoothing sheet 18 can have a suitable release agent on the side contacting the magnetic material 50.

The releaseable smoothing sheet 18 provides another function insofar as it imparts high smoothness characteristics to the top surface of the magnetic material 50. In other words, one not having many craters or protrusions. In essence, the smoothing sheet 18 serves as a master or replicating sheet for forming the surfaces of the plurality of magnetic oxide filled channels. The smoothing sheet also serves to retain the magnetic oxide material 50. While keeping the lands between the grooves substantially free of magnetic material. This assists in the formation of a plurality of discrete magnetic recording tracks.

Other materials can be used for the smoothing sheet 18 so long as they are, of course, smooth and do not hinder the electron beams or deteriorate when subjected to electron beams.

As noted previously, the second coating step is followed by another electron beam curing operation. The curing apparatus of this embodiment is like the last embodiment, hence the same structure will be indicated by like reference numerals with the addition of a prime marking. Upon entering the plenum chamber 34' the multilayered sheet is irradiated with high energy electron beams 42'. These beams 42' issue forth from an electron beam enery rod 44' contained in a high vacuum chamber 46'. The beams 42' are focused such that they pass through a titanium window and encompass a preselected area on the advancing composite. The energy rod 44' is suitably operated so that it produces an acceleration voltage sufficient to effectuate the polymerization of the magnetic oxide material 50. This acceleration voltage can be in a suitable range, for example, from about 150 to 300 kilovolts. Whatever acceleration voltage is selected however, the adsorbed dosage in the magnetic oxide material 50 should be sufficient to cause complete curing of the material in about 1.0 second. Although the curing need not be completed while the particles are in an orienting magnetic field by magnetic assembly 58, the dosage should be sufficient to effectuate polymerization to the point that viscosity increases, whereby particles become frozen or fixed in the desired orientation. Although a single beam of energy is used, a plurality of beams focused on different preselected areas is also contemplated. The present invention also contemplates that other forms of electromagnetic energy can be used to bring about curing. For example ultraviolet energy might be used.

Figure 4:
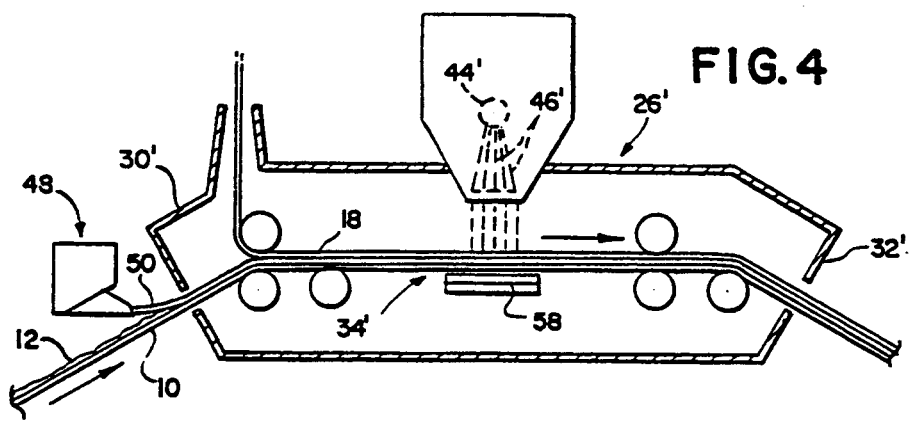
FIG. 4 is a diagrammatic view showing another set of steps in the process of producing magnetic recording media in accordance with the present invention.

FIG. 4 depicts the magnetic assembly 58 for producing the orienting magnetic field. In this embodiment, the assembly 58 includes a permanent magnet or magnets which have relatively high coercivity. For example, the magnets can be rare earth alloy types; such as samarium cobalt. The magnetic assembly 58 is positioned below the surface of the carrier 10 and beneath the preselected area covered by the electron beams. In this regard, the magnetic field produced by the magnetic assembly 58 extends such that it orients the magnetic particles 24 in a preferred direction. One example of such a direction is described in the last-noted application. The orienting field established by the rare earth alloy magnets has relatively very strong fields. These rare earth type magnets have relatively high coercivity. By way of example, the coercivity of such mangets for purposess of the present invention can be 20,000 oersteds. A coercivity of about 10,000 oersteds would also be satisfactory. Whatever strengths are selected though, they should be sufficient in terms of orienting the particles for the purposes intended. Since, the permanent magnet assembly 58 is below the carrier 10 its field does not deflect significantly the electron beams emanating from the energy rod 44'. There is a drop in the adsorbed dosage of electron beams because of the field. However, such drop does not impede rapid curing. Because of the sheet 18, the replicated surface of the magnetic recording tracks are extremely smooth. Because the magnetic recording tracks are cured before the sheet 18 is peeled there is litle likelihood of the magnetic oxide material adhering to the sheet as the latter is peeled. This is an advantage over the transfer coating process.

Since certain changes may be made in the above described apparatus and method without departing from the scope of the invention involved, it is intended that all matter contained in the description thereof or shown in the accompanying drawings shall be interpreted as illustrative and not in a limiting sense.

I claim:

1. A process of producing a magnetic recording medium comprising the steps of:

forming a preselected configuration on an exterior surface of an impressionable and uncured coating material carried on a substrate which coating material contains magnetically orientable particles, said forming step including engaging the exterior surface with a releasable forming member so as to form the preselected surface configuration; and said forming step including preliminarily forming the substrate with grooves and applying the coating material to each of the grooves and covering the grooves and the coating material with the forming member which has a smooth surface and which is imparted to the coating material in contact therewith to form the preselected surface configuration;

curing the coating while the forming member is in continuous engagement with the coating;

orienting the particles in a preferred direction by application of a magnetic orienting field just prior to and/or while the coating is being cured; and, releasing the forming member from the exterior surface such that release will not adversely affect the formed preselected configuration.

2. The process of claim 1 wherein said curing step is achieved through the application of a predetermined amount of electron beam energy.

3. The process of claim 1 wherein said grooves are formed by pressing a grooved pattern into the surface of an uncured substrate and almost immediately electron beam curing the substrate to form relatively rigid grooves.

4. A process of producing a magnetic recording medium comprising the steps of:

forming a preselected grooved configuration on an exterior surface of an impressionable and uncured coating material carried on a substrate, said forming step including engaging the exterior surface with a first forming member so as to form the preselected grooved surface configuration;

curing the coating while the forming member is in engagement therewith or immediately following engagement therewith;

applying a coating of uncured material containing magnetically orientable particles onto the grooved surface so as to substantially fill the grooves;

forming the exterior surface of the uncured material containing the particles by a second forming member with a second predetermined configuration so that the uncured material containing the particles is retained substantially only in the groove;

curing the uncured material containing the particles while the second forming member is in engagement therewith;

orienting the magnetic particles in at least a preferred direction by application of a magnetic orienting field just prior to and/or while the uncured particle containing material is being cured; and releasing the second forming member from the exterior surface of the cured material containing the particles such that release will not adversely affect the second predetermined configuration.

5. Apparatus for producing a magnetic recording medium comprising:

means for forming a substrate assembly with a plurality of grooves therein;

means for applying an uncured coating containing magnetically orientable particles to the grooves;

means for supporting the substrate assembly having the uncured coating on at least one side thereof;

means for forming a preselected configuration on an exterior surface of the uncured coating, said forming means includes a releasable member which is selectively engaged with the exterior surface so as to form thereon the preselected configuration;

means for curing the coating at least while said releasable member is in continuous engagement therewith;

means for orienting the particles just prior to and/or while the coating is being cured; and, means for releasing said forming member from the cured coating.

6. The apparatus of claim 5 wherein said releasable member is a smoothing sheet having a smooth planar surface engageable with the uncured coating whereby the preselected configuration is a smooth planar surface.

7. The apparatus of claim 5 wherein said curing means includes an apparatus which selectively directs electron beam energy at the coating.

8. The apparatus of claim 5 wherein said groove forming means includes a forming assembly having a surface thereof with a groove making configuration; said substrate assembly including a curable material which is preliminarily uncured; and means for curing the curable substrate material.

9. The apparatus of claim 8 wherein said forming surface of said forming assembly selectively engages the uncured substrate material to form the grooves and said substrate material curing means includes an apparatus which directs sufficient electron beam energy to cure the substrate curable material.

* * * * *